(12) United States Patent
Midorikawa

(10) Patent No.: US 8,173,919 B2
(45) Date of Patent: May 8, 2012

(54) SEAT BELT BUCKLE FASTENING DETECTOR AND SEAT BELT BUCKLE

(75) Inventor: Yukinori Midorikawa, Kanagawa (JP)

(73) Assignee: Autoliv Development AB, Vargarda (SE)

(*) Notice: Subject to any disclaimer, the term of this patent is extended or adjusted under 35 U.S.C. 154(b) by 707 days.

(21) Appl. No.: 12/307,448

(22) PCT Filed: Jun. 15, 2007

(86) PCT No.: PCT/JP2007/062163
§ 371 (c)(1),
(2), (4) Date: Jan. 7, 2009

(87) PCT Pub. No.: WO2008/004427
PCT Pub. Date: Jan. 10, 2008

(65) Prior Publication Data
US 2009/0314618 A1 Dec. 24, 2009

(30) Foreign Application Priority Data
Jul. 3, 2006 (JP) ................................ 2006-183668

(51) Int. Cl.
*H01H 3/16* (2006.01)
(52) U.S. Cl. .................... 200/250; 200/61.58 B
(58) Field of Classification Search ........... 200/61.58 B, 200/61.58 R, 252, 531, 541, 547, 550
See application file for complete search history.

(56) References Cited

U.S. PATENT DOCUMENTS
6,753,486 B2 * 6/2004 Matsui ..................... 200/61.41
6,926,367 B2 * 8/2005 Tomimatsu .................. 297/468

FOREIGN PATENT DOCUMENTS
| JP | 57-90528 | 11/1955 |
| JP | 49-18682 | 5/1974 |
| JP | 3-45710 | 4/1991 |
| JP | 6-28956 | 4/1994 |
| JP | 2003-81057 | 3/2003 |
| JP | 2005-190906 | 7/2005 |

* cited by examiner

*Primary Examiner* — Elvin G Enad
*Assistant Examiner* — Lisa Homza
(74) *Attorney, Agent, or Firm* — Brinks Hofer Gilson & Lione

(57) ABSTRACT

A seat belt buckle fastening detector 40, which detects the existence of seat belt fastening, includes a printed circuit board 41 including a normally-closed contact NC, a normally-opened contact NO, and a common contact COM. A slider 42 electrically connects the normally-closed contact NC and the common contact COM, or the normally-opened contact NO and the common contact COM. The common contact COM is formed on one surface 41*a* of the print circuit board 41, and the normally-closed contact NC and the normally-opened contact NO are formed on the other surface 41*b* of the print circuit board 41.

6 Claims, 9 Drawing Sheets

SEAT BELT BUCKLE FASTENING DETECTOR AND SEAT BELT BUCKLE

CROSS REFERENCE TO RELATED APPLICATIONS

This application claims priority to Japanese Patent Application Number 2006-183668, filed Jul. 3, 2006 and PCT/JP2007/062163, filed Jun. 15, 2007.

FIELD OF THE INVENTION

The present invention relates to a seat belt buckle fastening detector and a seat belt buckle.

BACKGROUND OF THE INVENTION

In various vehicles including automobiles, seat belt devices for protecting occupants in emergency such as collision are attached to seats thereof. In order to facilitate the occupant putting on and taking off the seat belt, a buckle device is normally provided. In general, this buckle device is configured so that a latch member for latching a tongue plate is biased by a spring in a latching direction for the tongue plate, and that the latch member is kept in a latching state between the tongue plate and a buckle main body by a lock member.

In such the buckle device, it is necessary to display the latching state between the tongue plate and the buckle main body by means of a lamp, to control the operation of a belt retracting force reducing mechanism such as a retractor, or to enable seat belt wearing on/off information to be transmitted to an air bag ECU (electronic control unit). Therefore, inside the buckle main body, there is provided a buckle fastening detector for detecting a latching state (refer to, for example, in Japanese Patent un-examined Publication JP-A-2003-81057—hereinafter "Japanese Publication 1").

As the buckle fastening detectors, a non-contact type detector including a Hall effect semiconductor element and a magnet, a contact type detector including a substrate having print-wired electrodes and a slider including a contact member which slides on the substrate are known. In the contact type buckle fastening detector described in Japanese Publication 1, as shown in FIG. 9 thereof, a normally-closed contact NC, a common contact COM, and a normally-opened contact NO are arranged in order on a rectangular substrate (100) with print-wired respectively in the rectangular shape. A slider (101) which slides with insertion of a tongue plate includes therein a contact member (102) having a contact (102a) abutting on the normally-closed contact NC or the common contact COM, and a contact (102b) abutting on the common contact COM or the normally-opened contact NO. In the non-latching condition, as shown by solid lines in FIGS. 9 and 10, the slider (101) connects electrically the common contact COM and the normally-closed contact NC. In the latching condition, as shown by a dashed dotted line in FIG. 10, the slider (101) connects electrically the common contact COM and the normally-opened contact NO. On the upper surface of the slider (101), an engagement protrusion (103) is formed, which fits into an engagement hole provided in a leg portion of an ejector (not shown).

Further, in another contact type buckle fastening detector shown in FIG. 11, of the Japanese Publication 1 a normally-closed contact NC and a normally-opened contact NO are arranged on a rectangular substrate (100) in parallel with a common contact COM, and their contacts are print-wired respectively in the rectangular shape. A slider (101), similarly to the above slider, includes therein a contact member (102) having a contact (102a) abutting on the common contact COM and a contact (102b) abutting on the normally-closed contact NC or the normally-opened contact NO. In the non-latching time, as shown by solid lines in FIGS. 11 and 12, the slider (101) connects electrically the common contact COM and the normally-closed contact NC. In the latching condition, as shown by a dashed dotted line in FIG. 12, the slider (101) connects electrically the common contact COM and the normally-opened contact.

In the seat belt buckle fastening detector described in the Japanese Publication 1, when the electric connection with the contact member of the slider is switched from the normally-opened contact NO to the normally-closed contact NC, as shown by chain double-dashed lines in FIGS. 10 and 12, there is a gray zone in which the slider neither contacts electrically with r the normally-closed contact NC nor the normally-opened contact NO. In order to reduce the width of this gray zone, it is desirable to reduce a surface distance between the normally-opened contact NO and the normally-closed contact NC. However, if the surface distance between the normally-opened contact NO and the normally-closed contact NC is reduced, there is high possibility that short-circuit is produced between the normally-opened contact NO and the normally-closed contact NC due to attachment of waterdrops (e.g. condensations of water).

SUMMARY OF THE INVENTION

In at least one embodiment of the present invention, a seat belt buckle fastening detector and a seat belt buckle are provided, in which without increasing time lag in switching between the normally-closed contact and the normally-opened contact, the surface distance between the normally-opened contact and the normally-closed contact is sufficiently long such that a short-circuit between these contacts can be prevented.

In one embodiment, a seat belt buckle fastening detector which detects the existence of seat belt fastening is provided. The detector includes a substrate including a normally-closed contact, a normally-opened contact, and a common contact. A movable electrode electrically connects either the normally-closed contact and the common contact, or the normally-opened contact and the common contact. Any one of the normally-closed contact, the normally-opened contact and the common contact is formed on one surface of the substrate, and the others are formed on another surface of the substrate.

In one aspect of the present invention, the common contact is formed on the one surface of the substrate, and the normally-closed contact and the normally-opened contact are formed on the other surface of the substrate. The movable electrode includes a contact member. The contact member includes a first plate portion having a first contact that abuts on the common contact, and a second plate portion having a second contact and a third contact that can abut on the normally-closed contact or the normally-opened contact.

In another aspect of the present invention, the normally-closed contact is formed on the one surface of the substrate, and the common contact and the normally-opened contact are formed on the other surface of the substrate. The movable electrode includes a contact member. The contact member includes a first plate portion having a first contact that can abut on the normally-closed contact, and a second plate portion having a second contact that abuts on the common contact and a third contact that can abut on the normally-opened contact.

In yet another aspect of the present invention, a seat belt buckle has the buckle fastening detector.

In another aspect of this invention, any one of the normally-closed contact, the normally-opened contact, and the common contact is formed on one surface of the substrate, and the others are formed on the other surface of the substrate. Therefore, without increasing time lag in switching between the normally-closed contact and the normally-opened contact, the surface distance between the normally-opened contact and the normally-closed contact is made sufficiently long, whereby the short-circuit between these contacts can be prevented.

Further objects, features and advantages of the invention will become apparent from consideration of the following description and the appended claims when taken in connection with the accompanying drawings.

DETAILED DESCRIPTION OF THE INVENTION

A seat belt buckle fastening detector according to each embodiment of the invention will be described below in detail with reference to drawings.

Figure 1:
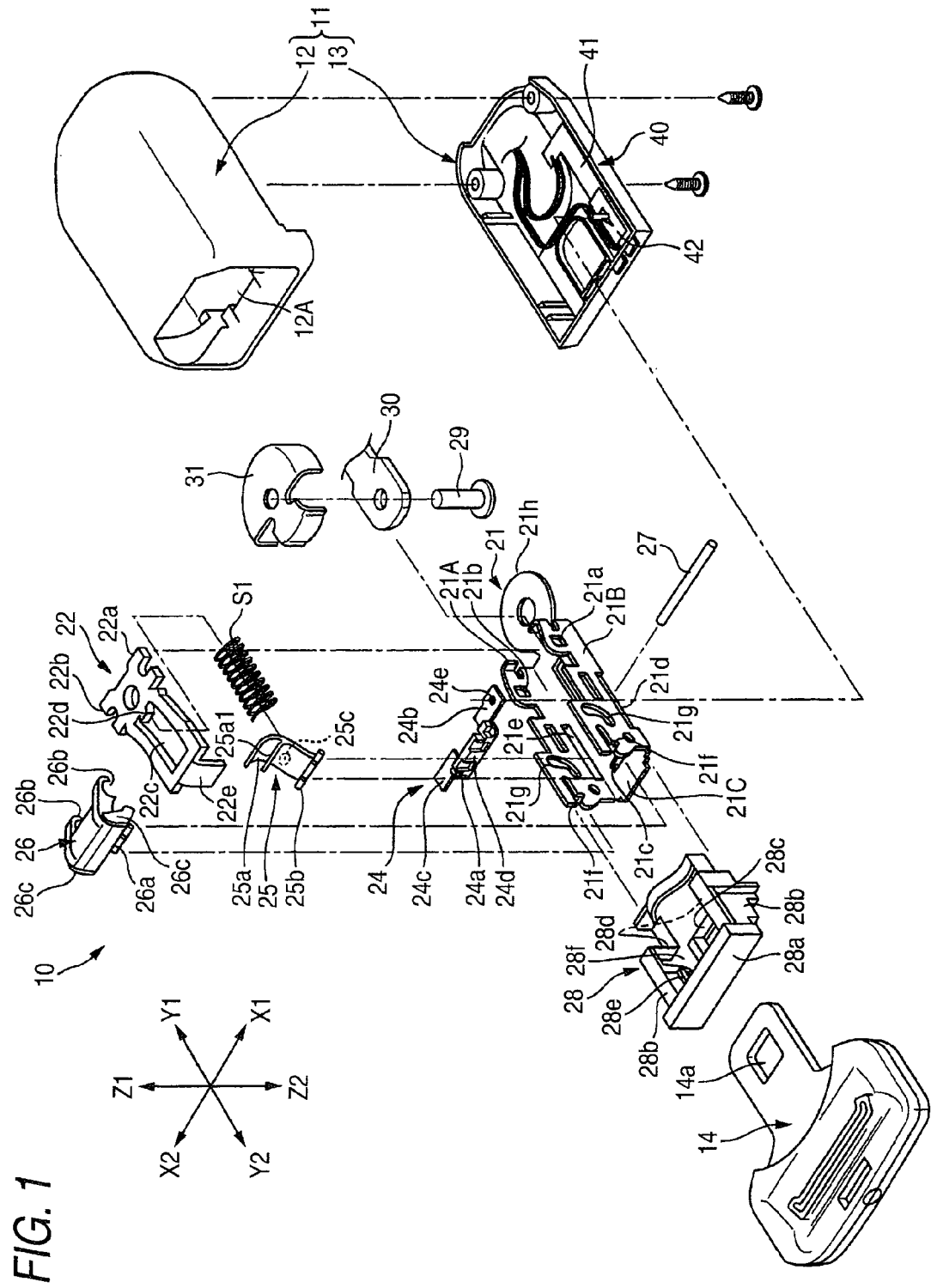
FIG. 1 is an exploded perspective view showing a seat belt buckle device in a first embodiment of the present invention.

FIG. 1 is an exploded perspective view showing a seat belt buckle device to which a seat belt buckle fastening detector in a first embodiment is applied. A buckle device 10 has a buckle main body 11 including an upper cover 12 and a lower cover 13, and a tongue plate 14 that attaches to and detaches from the buckle main body 11.

Inside the buckle main body 11, a frame 21 is provided, which includes a pair of side walls 21A, 21B, and a bottom portion 21C. The bottom portion 21C is provided between the pair side walls 21A, 21B, is U-shaped in section, and is formed of a metal plate such as S55C or the like. Further, inside the frame 21, a latch member 22 formed of a metal plate such as S45C, S50C or the like is provided. The latch member 22 has, at one end (at an end portion on an Y1-side in the figure) thereof, support arms 22a and 22b protruding in X1 and X2 directions, which are swingably supported in support holes 21a and 21b provided in the side walls 21A and 21B. In the center of the latch member 22, an opening part 22c is formed. At an edge portion of the opening part 22c, a lock convex part 22d protruding in an Y2-direction is formed. Further, at the other leading end (at an end portion on the Y2-side in the figure) of the latch member 22, there is provided a latch part 22e protruding in a Z2-direction.

Between the latch member 22 and the bottom portion 21C of the frame 21, an ejector 24 made of resin such as polyacetal resin is provided. The ejector 24 includes a base portion 24a formed in the U-shape, and arm portions 24b and 24c extending from both leading ends of the base portion 24a to both sides (in the X1 and X2 directions). Further, on a surface on the Y2-side of the base portion 24a, a pressed portion 24d is formed.

The arm portions 24b and 24c are inserted into long holes 21d and 21e formed respectively between the both side walls 21A, 21B and the bottom portion 21C, and leading ends of the arm portions 24b and 24c extend to the outside of the frame 21. By the movement of the arm portions 24b, 24c in the long holes 21d, 21e, the ejector 24 can slide on the frame 12 in directions where the tongue plate is inserted and removed.

By the U-shaped base portion 24a of the ejector 24, a cantilever 25 which includes at a leading end thereof a lock portion 25a formed curvedly and includes on its base side a shaft portion 25b is rotatably supported. In the surface of the lock portion 25a, a hook convex portion 25a1 is provided.

Further, on the surface of the cantilever 25, a spring holding protrusion 25c is formed, and between the spring holding protrusion 25c and the lock convex portion 22d of the latch member 22, an urging member S1 such as a coil spring is provided in a compressed state. Between the spring holding protrusion 25c and the lock convex portion 22d, the urging force acts in a direction to seperate each other 25c and 22d. The urging member S1 always urges the lock portion 25a side which is the leading end of the cantilever 25, in a counter-clockwise direction in FIG. 1.

As shown in FIG. 1, on the Y2-side of both side walls 21A, 21B of the frame 21, notch portions 21f, 21f are formed. The notch portion 21f is formed by a long groove extending in the Y-direction of the figure and a recess groove denting in the Z2-direction. Into the recess grooves of the notch portions 21f, 21f, a rotational shaft 26c is inserted to provide a stopper 26 that is swingably supported. At a lower end in the Z2-direction of the stopper 26, an operating shaft 26a is formed that extends in the X1 and X2 directions. At a leading end in the Y-direction of the stopper 26, hook portions 26b, 26b are formed integrally with the stopper 26. The hook portion 26b, 26b are arranged in a moving locus of a lock bar 27 described below.

In the both side walls 21A and 21B of the frame 21, guide holes 21g and 21g perforated nearly in the L-shape are symmetrically formed. Into the guide holes 21g and 21g, the lock bar 27 is inserted. The lock bar 27 can move in the guide holes 21g and 21g together with the cantilever 25. Further, the lock bar 27, in the latching state is locked to the lock portion 25a of the cantilever 25 and is held by the hook portions 26b, 26b of the stopper 26.

On the Y2-side of the frame 21, a release button 28 is provided, which moves freely in the attachment and detachment direction. The release button 28 includes an operational portion 28a which is exposed to the outside through an opening 12A provided on the Y2-side of the upper cover 12, and leg portions 28b, 28b extending from the operational portion 28a in the Y1-direction of the figure. At the leading end portions of the leg portions 28b, 28b, operational concave portions 28d, 28d are formed. Into the operational concave portions 28d, 28d, both ends of the lock bar 27, which extend from the guide holes 21g, 21g of the frame 21 to the outside, are inserted.

On both inner surfaces of the leg portions 28b, 28b, guide convex portions 28e, 28e are formed, which protrude inwardly and extend in the Y-direction of the figure. The guide convex portions 28e, 28e are inserted respectively into the long grooves of the notch portions 21f, 21f formed in the frame 21. When the release button 28 moves in the Y1 and Y2 directions, the guide convex portions 28e, 28e are guided along the long groove of the notch portions 21f, and 21f. Accordingly, the release button 28 can move in parallel to the bottom portion 21C of the frame 21.

Further, the release button 28 is provided with a lower end portion 28f which protrudes from the surface on the Y1-side of the operational portion 28a. In the lower end portion 28f, a bearing groove 28c extending in the X-direction of the figure is formed. Into the bearing groove 28c, the operating shaft 26a of the stopper 26 is rotatably inserted. Therefore, when the operational portion 28a of the release button 28 is push-operated in the Y1-direction of the figure, the bearing groove 28c actuates the operating shaft 26a of the stopper 26 in the Y1-direction of the figure, so that the rotation in counter-clockwise direction in FIG. 1 of the stopper 26 becomes possible. Similarly, when the release button 28 is moved in the Y2-direction of the figure, the rotation in clockwise direction in FIG. 1 of the stopper 26 becomes possible. Further, between the lower end portion 28f of the release button 28 and the bottom portion 21C of the frame 21, there is provided a clearance into which a leading end portion of the tongue plate 14 can be inserted.

Further, on the Y1-side of the bottom portion 21C of the frame 21, a plate attaching portion 21h projecting outward is provided. The plate attaching portion 21h, one leading end portion of an anchor plate 30 inserted from the insertion portion of the buckle main body 11, and a plate cover 31 attached above the anchor plate 30 are calked and fixed by a rivet 29. The other end portion of the anchor plate 30 is locked to a car body frame from the side portion of the seat.

Figure 2:
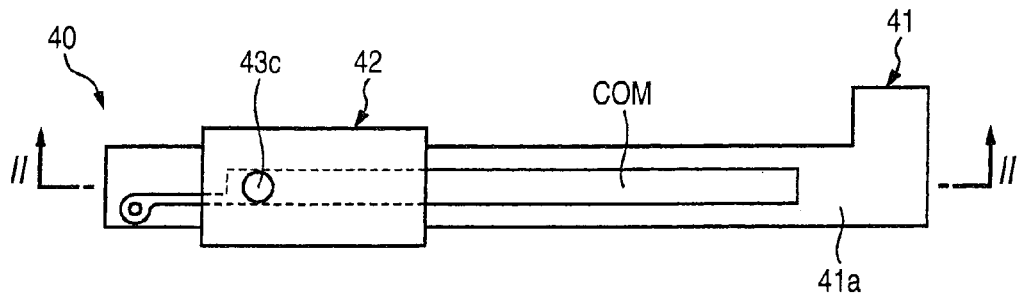
FIG. 2 shows a seat belt buckle fastening detector according to the first embodiment of the present invention, in which (a) is a top view, (b) is a bottom view, and (c) is a sectional view taken along a line III-III of (a)
Figure 2:
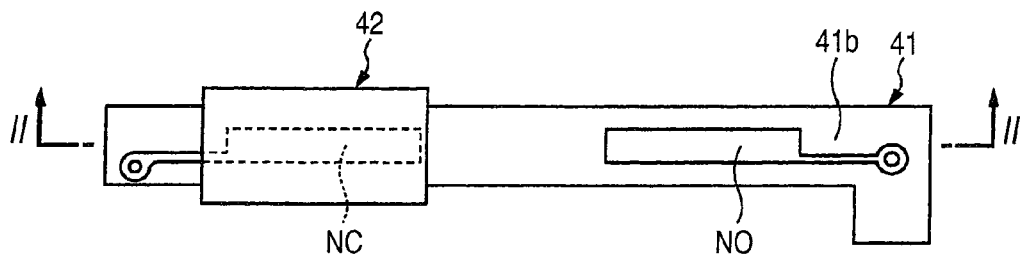
Figure 2:
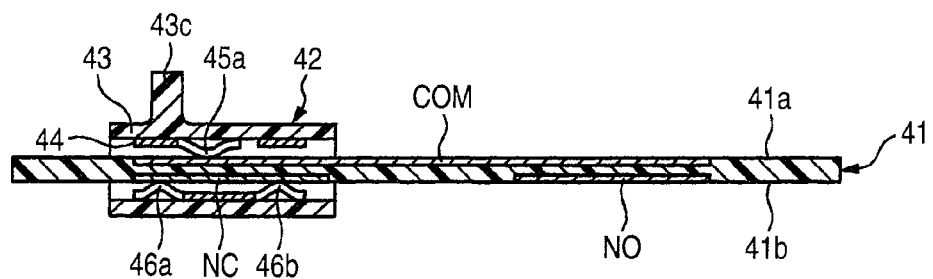

Further, inside the buckle main body 11, as shown in FIGS. 1 and 2, a buckle fastening detector 40 is provided, which includes a printed circuit board 41 having a normally-closed contact NC, a normally-opened contact NO, and a common contact COM. A slider, 42 acting as a movable electrode, electrically connects the normally-closed contact NC and the common contact COM, or the normally-opened contact NO and the common contact COM.

The printed circuit board 41 comprises glass epoxy material, glass composite material, or the alike. The common contact COM is print-wired on one surface 41a of the board 41, and the normally-closed contact NC and the normally-opened contact NO are print-wired on the other surface 41b of the board 41.

Figure 3:
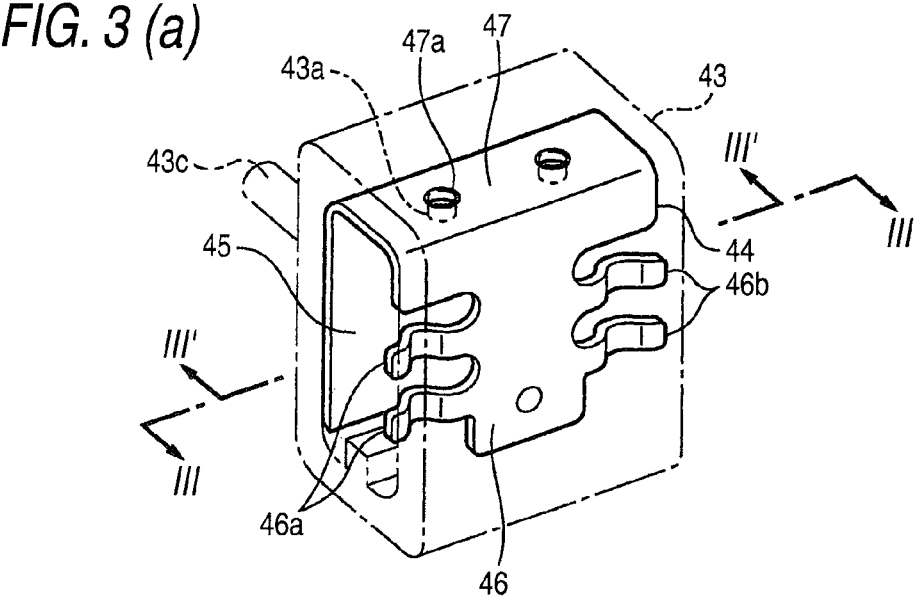
FIG. 3 shows a slider of the buckle fastening detector depicted in FIG. 2, in which (a) is a partially perspective view, (b) is a sectional view taken along a line III-III of (a), and (c) is a sectional view taken along a line III-III of (a)
Figure 3:
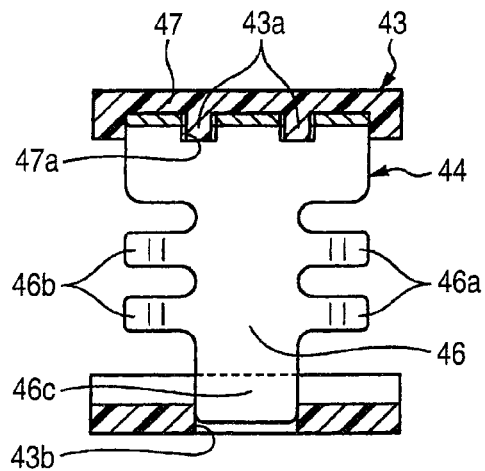
Figure 3:
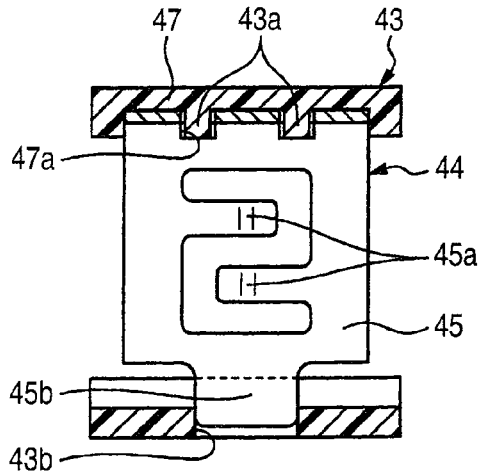

The slider 42, as shown in FIG. 3, includes a cover member 43 made of resin such as polyacetal, and a contact member 44 built in the cover member 43. The contact member 44 is formed in section nearly in the U-shape, which includes a first plate portion 45 having a first contact 45a that in at least one embodiment always abuts on the common contact COM. A second plate portion 46 has a second contact 46a and a third contact 46b that can abut on the normally-closed contact NC or the normally-opened contact NO, and a coupling portion 47 which connects to the first plate portion 45 and the second plate portion 46. A positioning projection 43a that protrudes from the inner surface of the cover member 43 is engaged in an engagement hole 47a provided in the coupling portion 47 and further, leading end convex portions 45b and 46c of the first and second plate portions 45 and 46 are engaged in concave portions 43b formed in the cover member 43, whereby the contact member 44 is positioned in the cover member 43.

Further, a pole-shaped engagement convex portion 43c is formed on the upper surface of the cover member 43, and is fitted into an engagement hole 24e formed in the leg portion 24b of the ejector 24.

The common contact COM is formed on one surface 41a of the printed circuit board 41 and is disposed adjacent the normally-closed contact NC and the normally-opened contact NO that are formed on the other surface 41b. The common contact COM extends up to the vicinity of both ends of the board 41. Further, the normally-closed contact NC and the normally-opened contact NO are spaced apart with a surface distance that is slightly larger than the distance between the second and third contacts 46a and 46b of the contact member 44.

In the constructed buckle device 10, by the insertion of the tongue plate 14, the leading end of the tongue plate 14 abuts on the abutted portion 24d of the ejector 24, and the ejector 24 is moved in the Y1-direction in FIG. 1. At this time, while the cantilever 25 is being moved in the insertion direction together with the ejector 24 against the urging force of the urging member S1, the leading end of the cantilever 25 is swung in the counterclockwise direction in the figure. The leading end of the cantilever 25 acts so as to press the lock bar 27 down and further, the lock bar 27 acts so as to press the latch portion 22e side of the latch member 22 down. When the ejector 24 moves more, the latch portion 22e of the latch member 22 is inserted into a latch hole 14a provided in the tongue plate 14, and enters into the guide hole 21c provided in the bottom portion 21C of the frame 21, so that the tongue plate 14 is latched (putted in a latching state) by the latch member 22.

On the other hand, in the case where the latching state is released, the release button 28 is pressed in the Y1-direction, whereby the stopper 26 is rotated in the counterclockwise direction in FIG. 1, and locking by the lock bar 27 is released. Simultaneously, the releases button 28 moves the lock bar 27 in the Y1-direction, resulting in the cantilever 25 and the ejector 24 also moving in the Y1-direction so as to compress the urging member S1. When the release button 28 is pressed more, the cantilever 25 rotates quickly clockwise by the movement of the lock bar 27. The latch member 22 rotates clockwise by a vertical component (component in the Z1-direction) of the urging force by the urging member S1. Therefore, the latch portion 22e of the latch member 22 detaches from the latch hole 14a provided in the tongue plate 14 and the guide hole 21c of the frame 21 (non-latching state), so that latching of the tongue plate 14 by the latch member 22 is released.

Figure 4:
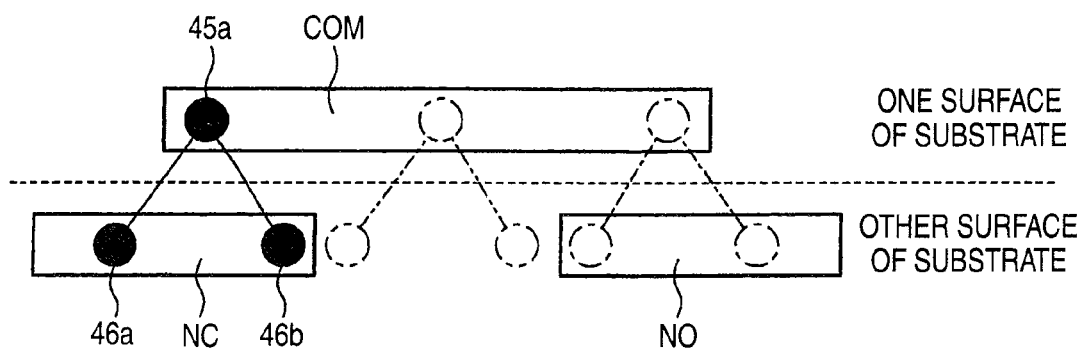
FIG. 4 is a schematic view for explaining the operation of the buckle fastening detector depicted in FIG. 2.

In the buckle fastening detector 40 in the non-latching state, as shown in FIG. 2 and a solid line in FIG. 4, the contact member 44 of the slider 42 connects electrically to the common contact COM and the normally-closed contact NC. Further, when the non-latching state is switched to the latching state, the slider 42 moves with the movement of the ejector 24, and the contact member 44 connects electrically to the common contact COM and the normally-opened contact NO as shown by a dashed dotted line in FIG. 4. When the non-latching state shifts to the latching state, the abutment between the second contact 46a and the normally-closed contact NC is released (chain double-dashed line in FIG. 4). However, since the third contact 46b abuts on the normally-opened contact NO immediately after the release, the normally-closed contact NC and the normally-opened contact NO can be quickly switched.

Figure 5:
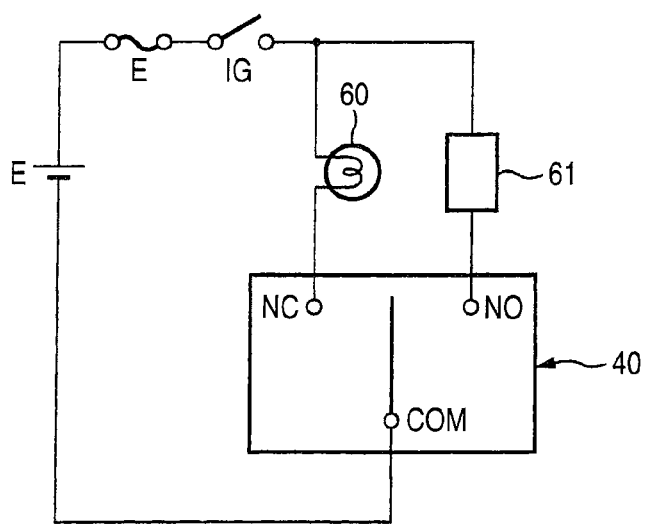
FIG. 5 is a diagram for explaining circuit constitution of the seat belt buckle device in accordance with an embodiment of the present invention.
Figure 6:
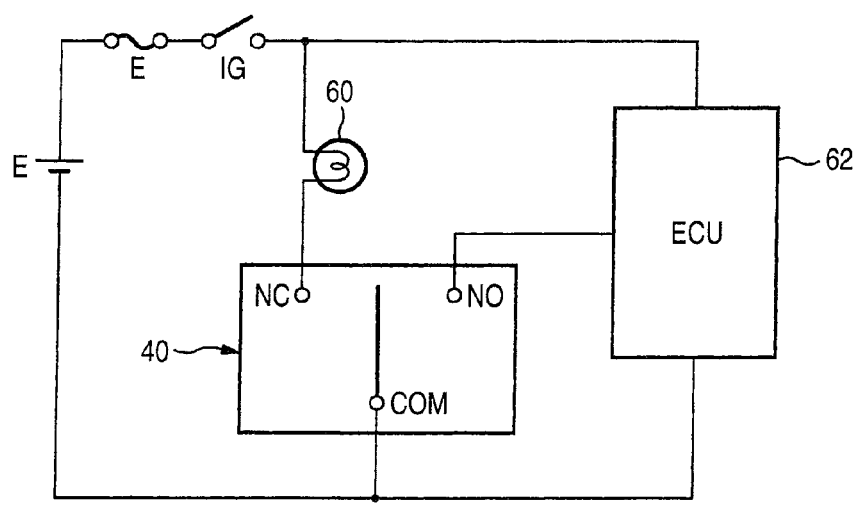
FIG. 6 is a diagram for explaining another circuit constitution of the seat belt buckle device in accordance with an embodiment of the present invention.

FIGS. 5 and 6 show circuit constitutions in the buckle main body 10 and outlines of electric connection with the outside. In FIG. 5, a belt warning lamp 60 is connected to the normally-closed contact NC. An electromagnetic solenoid 61 that is a retracting force reducing mechanism is connected to the normally-opened contact NO. To the belt warning lamp 60 and the electromagnetic solenoid 61, the electric power is supplied from a battery E through a fuse F and an ignition switch IG.

In one aspect as shown, in FIG. 6, a belt warning lamp 60 is connected to the normally-closed contact NC. An electronic control unit (ECU) 62 for air bag is connected to the normally-opened contact NO. To the belt warning lamp 60 and the ECU 62, the electric power is supplied from a battery E through a fuse F and an ignition switch IG.

In one example, when an occupant starts to drive an automobile, the ignition switch IG is turned on. At this time for the case where the buckle fastening detector 40 is in the non-latching state, the belt warning lamp 60 is illuminated. Thereafter, when the buckle fastening detector 40 is put in the latching state, in FIG. 5, the electromagnetic solenoid 61 is excited and the retracting force reducing mechanism operates. In FIG. 6, the ECU 62 detects the electric current so as to enable the air bag to operate.

Accordingly, in the seat belt buckle fastening detector 40 in this embodiment, since the common contact COM is formed on one surface 41a of the printed circuit board 41, and the normally-closed contact NC and the normally-opened contact NO are formed on the other surface 41b of the printed circuit board 41, without increasing time lag in switching between the normally-closed contact NC and the normally-opened contact NO, the surface distance between the normally-closed contact NC and the normally-opened contact NO is made sufficiently long, whereby the short-circuit between these contacts caused by attachment of waterdrops or the like can be prevented.

Further, the slider 42 includes the contact member 44 which includes the first plate portion 45 having the first contact 45a that in at least one embodiment always abuts on the common contact COM, and the second plate portion 46 having the second contact 46a and the third contact 46b that can abut on the normally-closed contact NC or the normally-opened contact NO. Therefore, by only changing the arrangement of the second and third contacts 46a and 46b according to the surface distance between the normally-closed contact NC and the normally-opened contact NO, the above advantage can be readily exhibited. Regarding the first to third contacts 45a, 46a, and 46b, they may include plural contacts respectively as in this embodiment, or they may be a single contact respectively.

A seat belt buckle fastening detector according to a second embodiment of the invention will be described with reference to FIGS. 7 and 8. Since the buckle device is configured similar to that in the first embodiment except for the buckle fastening detector, its description is omitted.

In a buckle fastening detector 40a in this embodiment, a normally-closed contact NC is print-wired on one surface 41a of a print circuit board 41, and a common contact COM and a normally-opened contact NO are print-wired on the other surface 41b of the board 41.

A contact member 44 of a slider 42 built in a cover member 43 includes a first plate portion 45 having a first contact 45a that can abut on the normally-closed contact NC, and a second plate portion 46 having a second contact 46a that in at least one embodiment always abuts on the common contact COM and a third contact 46b that can abut on the normally-opened contact NO.

Preferably, the length of the common contact COM is set so that the second contact 46a always abuts on the common contact COM in a stroke of the slider 42. Further, in case that the first contact 45a and the third contact 46b are in opposing positions to each other in a longitudinal direction as in this embodiment, the normally-closed contact NC and the normally-opened contact NO are arranged, in top view, with a slight gap between a center-side end portion of the normally-closed contact NC and a center-side end portion of the normally-opened contact NO in such a way that the third contact 46b abuts on the normally-opened contact NO as soon as the first contact 45a separates from the normally-closed contact NC. The lengths of the normally-closed contact NC and the normally-opened contact NO, as long as the third contact 46b abuts on the normally-opened contact NO as soon as the first contact 45a separates from the normally-closed contact NC, may be appropriately set together with the arrangement of the first contact 45a and the third contact 46b.

Figure 7:
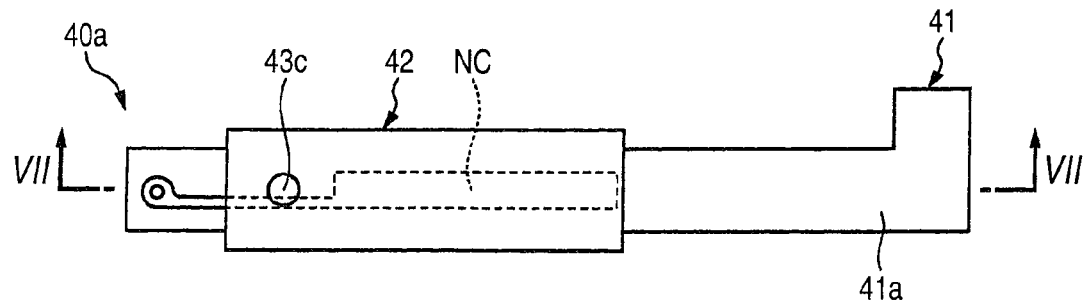
FIG. 7 shows a seat belt buckle fastening detector according to a another embodiment of the present invention, in which (a) is a top view, (b) is a bottom view, and (c) is a sectional view taken along a line VII-VII of (a)
Figure 7:
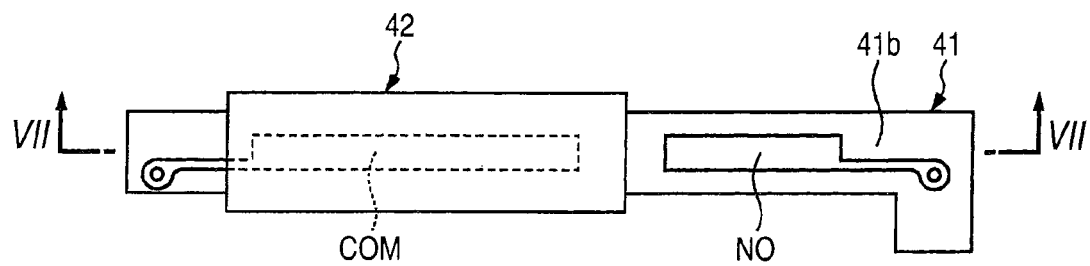
Figure 7:
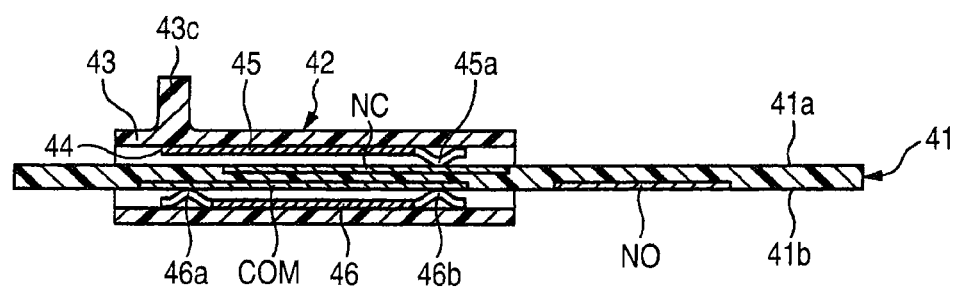
Figure 8:
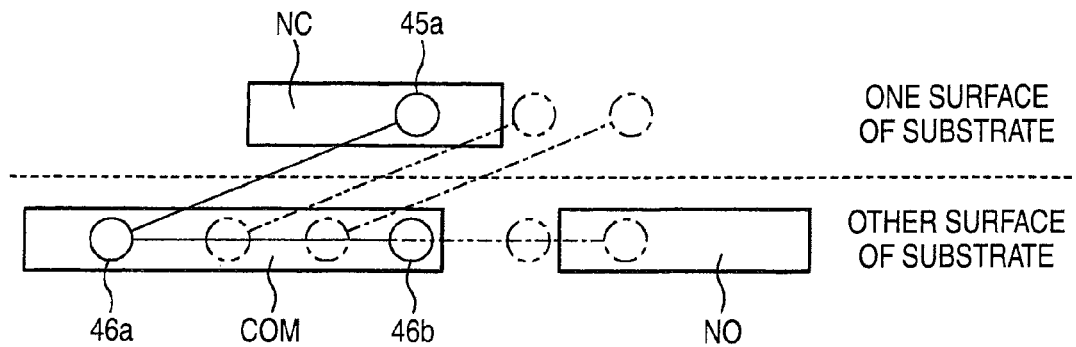
FIG. 8 is a schematic view for explaining the operation of the buckle fastening detector depicted in FIG. 7.
Figure 9:
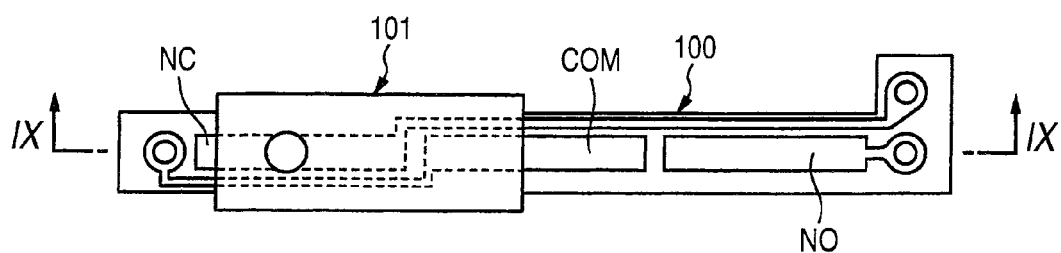
FIG. 9 shows a conventional seat belt buckle fastening detector, in which (a) is a top view, and (b) is a sectional view taken along a line IX-IX of (a)
Figure 9:
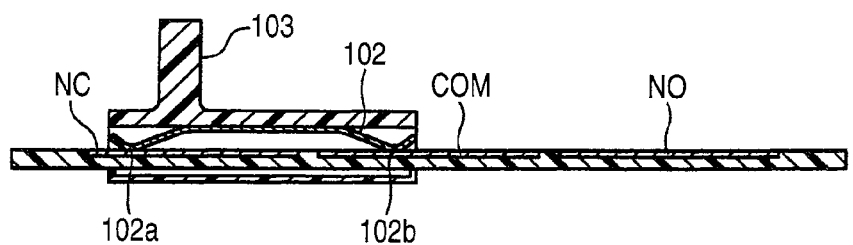
Figure 10:
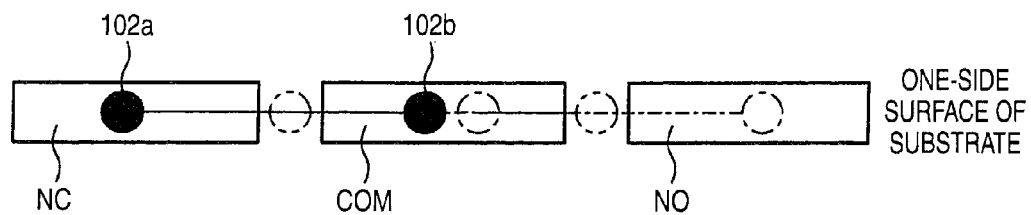
FIG. 10 is a schematic view for explaining the operation of the buckle fastening detector of FIG. 9.
Figure 11:
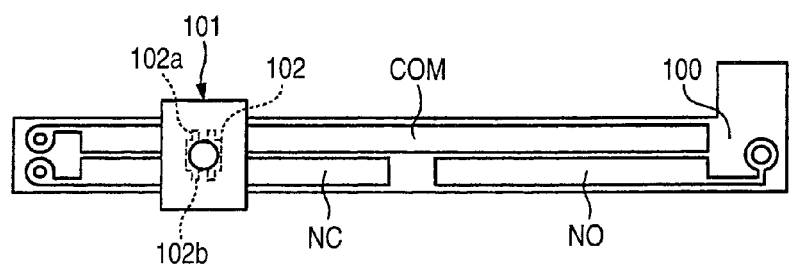
FIG. 11 is a top view showing another conventional seat belt buckle fastening detector.
Figure 12:
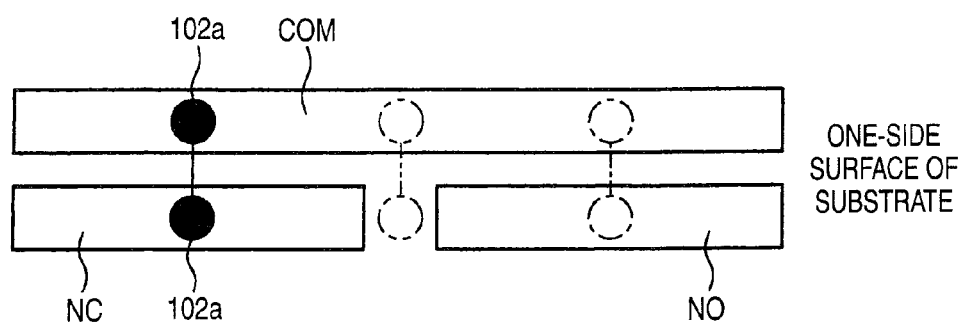
FIG. 12 is a schematic view for explaining the operation of the buckle fastening detector depicted in FIG. 11.

In the constituted buckle fastening detector 40a in the non-latching state, as shown in FIG. 7 and by a solid line in FIG. 8, the contact member 44 of the slider 42 connects electrically to the common contact COM and the normally-closed contact NC. Further, when the non-latching state is switched to the latching state, the slider 42 moves with the movement of an ejector 24, and the contact member 44 connects electrically to the common contact COM and the normally-opened contact NO as shown by a dashed dotted line in FIG. 8. When the non-latching state shifts to the latching state, the abutment between the first contact 45a and the normally-closed contact NC is released (chain double-dashed line in FIG. 8). However, since the third contact 46b abuts on the normally-opened contact NO immediately after the release, the normally-closed contact NC can be quickly switched to the normally-opened contact NO.

Accordingly, in the seat belt buckle fastening detector 40a in this embodiment, since the normally-closed contact NC is formed on one surface 41a of the printed circuit board 41, and the common contact COM and the normally-opened contact NO are formed on the other surface 41b of the printed circuit board 41, without increasing time lag in switching between the normally-closed contact NC and the normally-opened contact NO, the surface distance between the normally-closed contact NC and the normally-opened contact NO is made sufficiently long. Thus a short-circuit between these contacts caused by attachment of waterdrops or the alike can be prevented.

Further, the slider 42 includes the contact member 44 which includes the first plate portion 45 having the first contact 45a that can abut on the normally-closed contact NC, and the second plate portion 46 having the second contact 46a that in at least one embodiment always abuts on the common contact COM and the third contact 46b that can abut on the normally-opened contact NO. Therefore, by only changing the arrangement of the first and third contacts 45a and 46b according to the surface distance between the normally-closed contact NC and the normally-opened contact NO in top view, the above advantage can be readily exhibited.

Other constitution and operation are similar to those in the first embodiment.

The invention is not limited to the above embodiments but improvements or modifications can be appropriately made.

The movable electrode of the invention is not limited to that in the embodiments, but it may be designed in the arbitrary shape as long as the surface distance between the normally-closed contact NC and the normally-opened contact NO is made sufficiently long, and the time lag in switching between their contacts can be sufficiently reduced.

The normally-closed contact NC, the normally-opened contact NO, and the common contact COM of the printed circuit board 41 in the embodiments, as long as the operation of the invention can be obtained, may be wired in arbitrary positions, shapes and lengths. Further, when the printed circuit board 41 is disposed in the buckle main body, one surface 41a or the other surface 41b may be used as an upper surface.

The present invention is based on Japanese priority application (No. 2006-183668), filed on Jul. 3, 2006, the entire contents of which are hereby incorporated by reference.

The invention claimed is:

1. A seat belt buckle fastening detector for detecting a seat belt in one of a fastened and unfastened condition with a buckle, the detector comprising:
    a substrate having a first surface and a second surface, a normally-closed electrical contact, a normally-opened electrical contact, and a common electrical contact, the common contact being formed on the first surface of the substrate, and the normally-closed contact and the normally-opened contact being formed on the second surface of the substrate; and
    a movable electrode having a contact member including:
        a first plate portion having a first contact that continuously abuts the common contact; and
        a second plate portion having a second contact and a third contact abutting the second surface, the second and third contacts being configured to connect the one of the normally-closed contact and the normally-opened contact to the common contact in the fastened position and to connect the other one of the normally-closed contact and the normally-opened contact to the common contact in the unfastened position.

2. A seat belt buckle including the buckle fastening detector of claim 1.

3. The seat belt buckle fastening detector according to claim 1, wherein the first surface and the second surface of the substrate are disposed opposite each other.

4. A seat belt buckle fastening detector for detecting a seat belt in one of a fastened and unfastened condition with a buckle, the detector comprising:
    a substrate having a first surface and a second surface, a normally-closed contact, a normally-opened contact, and a common contact, the normally-closed contact being formed on the first surface of the substrate, and the common contact and the normally-opened contact being formed on the second surface of the substrate; and
    a movable electrode having a contact member including:
        a first plate portion having a first contact that is configured to abut the first surface in one of the fastened condition and the unfastened condition; and
    a second plate portion having a second contact and a third contact, the second contact continuously abutting the common contact and the third contact is configured to abut the normally-opened contact in the other one of the fastened condition and the unfastened condition.

5. A seat belt buckle including the buckle fastening detector of claim 4.

6. The seat belt buckle fastening detector according to claim 4, wherein the first surface and the second surface of the substrate are disposed opposite each other.

* * * * *